United States Patent
Aboulhosn

(10) Patent No.: US 12,401,973 B2
(45) Date of Patent: Aug. 26, 2025

(54) FEE RE-RATING FOR A WIRELESS CARRIER NETWORK

(71) Applicant: T-Mobile USA, Inc., Bellevue, WA (US)

(72) Inventor: Maher Aboulhosn, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 456 days.

(21) Appl. No.: 17/842,621

(22) Filed: Jun. 16, 2022

(65) Prior Publication Data

US 2023/0413021 A1 Dec. 21, 2023

(51) Int. Cl.
*H04W 4/24* (2024.01)
*H04M 15/00* (2024.01)
*H04M 15/10* (2006.01)
*H04W 8/18* (2009.01)

(52) U.S. Cl.
CPC ............ *H04W 4/24* (2013.01); *H04M 15/10* (2013.01); *H04M 15/41* (2013.01); *H04M 15/80* (2013.01); *H04W 8/18* (2013.01)

(58) Field of Classification Search
CPC ......... H04W 4/24; H04W 8/18; H04M 15/10; H04M 15/41; H04M 15/80; H04M 15/00; H04M 15/43; H04M 15/44; H04M 15/58; H04M 15/70; H04M 15/73
See application file for complete search history.

(56) References Cited

U.S. PATENT DOCUMENTS

| | | | |
|---|---|---|---|
| 10,410,237 B1* | 9/2019 | Barnes | G06Q 30/0241 |
| 10,750,335 B1* | 8/2020 | Palaniappan | H04W 4/24 |
| 11,418,642 B1* | 8/2022 | Wicker | H04M 15/41 |
| 2002/0147001 A1* | 10/2002 | Newdelman | H04W 4/24 455/406 |
| 2003/0229613 A1* | 12/2003 | Zargham | H04Q 3/66 |
| 2004/0114741 A1* | 6/2004 | Ngo | H04W 4/24 379/230 |
| 2005/0181796 A1* | 8/2005 | Kumar | H04W 4/24 455/445 |
| 2007/0100760 A1* | 5/2007 | Dawson | G06Q 10/06 705/52 |

(Continued)

FOREIGN PATENT DOCUMENTS

TR 201720732 A2 * 12/2003

*Primary Examiner* — Matthew D. Anderson
*Assistant Examiner* — Abdullah Al Mamun

(57) ABSTRACT

A business logic used to generate call details records (CDRs) for a plurality of subscribers by a wireless carrier network is imported. A selection of one or more data collector applications that are listed in the business logic is received and one or more configuration parameters in the business logic are updated based on one or more inputted parameter updates. A selection of one or more CDR distributor applications listed in the business logic is also received. A particular set of CDRs in the specific group of CDRs is further selected based on one or more inputted selection parameters. Reprocessed CDRs that correspond to the particular set of CDRs are generated according to at least the one or more updated configuration parameters in the business logic and sent to the one or more billing systems via the one or more CDR distributor applications to trigger recalculation of service fees.

20 Claims, 11 Drawing Sheets

(56) References Cited

U.S. PATENT DOCUMENTS

| | | | |
|---|---|---|---|
| 2010/0110890 A1* | 5/2010 | Rainer | H04W 4/24 370/232 |
| 2010/0185534 A1* | 7/2010 | Satyavolu | H04M 15/8044 705/30 |
| 2010/0290610 A1* | 11/2010 | Gore | H04M 15/00 379/142.15 |
| 2014/0171021 A1* | 6/2014 | Davis | H04M 15/70 455/408 |
| 2015/0341182 A1* | 11/2015 | Awuah | H04M 15/31 455/407 |
| 2016/0088463 A1* | 3/2016 | Stanke | H04M 3/5116 455/404.1 |
| 2016/0135067 A1* | 5/2016 | Morad | H04M 15/70 455/423 |
| 2017/0134178 A1* | 5/2017 | Yang | H04L 12/1485 |
| 2017/0366503 A1* | 12/2017 | Lee | H04L 65/1036 |
| 2018/0034862 A1* | 2/2018 | Friend | G06Q 30/02 |
| 2018/0364975 A1* | 12/2018 | Kwong | G06F 3/167 |
| 2020/0404104 A1* | 12/2020 | Shah | H04L 12/1471 |
| 2021/0337460 A1* | 10/2021 | Breaux, III | H04W 8/18 |
| 2022/0078289 A1* | 3/2022 | Karupanan Subramanian | H04M 15/58 |
| 2022/0103680 A1* | 3/2022 | Sopic | H04M 3/2281 |
| 2022/0109759 A1* | 4/2022 | Bhoria | H04W 4/24 |

* cited by examiner

FIG. 4a

400 — (outer frame)
402 — (form area)

| DB Lookup | :::Record Lookup::: | Automated Lookup |

Record Search: Search for records in the selected node and path entered

Server / Node ID * — Record Name parameter — Path where records reside *

Server ID ▽
BGWPOL21
:::BGWPOL22:::
BGWPOL23
BGWPOL24
BGWTIT21
BGWTIT22

P00CC001
:::P00CC001_ACC:::
P00CC001_NetCracker
P00CC001_RPX
POSDP031_RPX

404

/TTBackup/Archive/
TTBackupArchive

406

Date & Time From — Date & Time To

408

BGWPOL21 | P00CC001_ACC | /TTBackup/Archive/TTBackupArchive | 4/9/2018, 5:16 PM | 5/9/2018, 5:16 PM Search — 410

* Indicates that a field is mandatory

Record Lookup Result: Select the records to Lookup

| BGWPOL21 | POOCC001_ACC | /TTBackup/Archive/TTBackupArchive | 4/9/2018, 5:16 PM | 5/9/2018, 5:16 PM |

412

Select the Records list to Export

Apr12.16_30_01.POOCC001_ACC.Archive
Apr13.04_30_01.POOCC001_ACC.Archive
Apr13.16_30_01.POOCC001_ACC.Archive
Apr14.04_30_01.POOCC001_ACC.Archive
Apr14.16_30_01.POOCC001_ACC.Archive
Apr15.04_30_01.POOCC001_ACC.Archive
Apr15.16_30_01.POOCC001_ACC.Archive

414

Export  416

* Indicates that a field is mandatory

FEE RE-RATING FOR A WIRELESS CARRIER NETWORK

BACKGROUND

The subscribers of a wireless carrier network are billed service fees for using the wireless telecommunication services provided by the wireless carrier network. For example, the wireless telecommunication services may include voice calling, text or multimedia messaging, and uploading and downloading of data via the Internet using various wireless telecommunication devices. Depending on the wireless service plan of a subscriber, the service fees charged to the subscriber may include recurring service fees and/or one-time service fees. Such service fees may be calculated by the wireless carrier network based on service usage records, also referred to as call detail records (CDRs), that are generated by the various network nodes of the wireless carrier network. For example, such network nodes of the wireless carrier network may include Charge and Control nodes (CCNs), Operations Control Centers (OCCs), IP Multimedia Subsystems (IMSs), Affinity Network Fusion (ANF) components, Similarity Network Fusion (SNF) components, and/or so forth. The CDRs are then used by the various billing systems of the wireless carrier network to generate service fee bills for the subscribers. The term "re-rating" refers to a process by which such service fees of a subscriber may be recalculated so that the service fees may be adjusted after the service fees are initially calculated by a billing system.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4a illustrates an example record query interface provided by the lookup tool of the re-rating engine for querying a database for a list of CDRs that are affected by an anomalous event.

FIG. 4b illustrates an example record query result interface provided by the lookup tool of the re-rating engine that presents the list of CDRs for exporting to the CDR reprocessing tool such that reprocessed CDRs can be generated for the list CDRs.

FIG. 5a illustrates an example automated query interface provided by the lookup tool of the re-rating engine for querying a database for a list of subscriber identifiers or a list of CDRs that are affected by an anomalous event.

DETAILED DESCRIPTION

This disclosure is directed to techniques that enable a wireless carrier network to re-rate the service fees that are owed by the subscribers for using the wireless telecommunication such that the service fees may be adjusted after the service fees are initially calculated. The service fees may be initially calculated based on service usage records, also referred to as call detail records (CDRs), that are generated by the various network nodes of the wireless carrier network.

However, in some instances, the services fees may have to be recalculated for a set of subscribers. In order for the service fees to be recalculated for the set of subscribers, the relevant CDRs that are associated with the set of subscribers may be identified. For example, a re-rating engine may include a lookup tool that enables an administrator to query for affected CDRs of subscribers that fall within a particular date range and fit certain search attributes (e.g., account type, service class, alarm identifier, etc.) via a database lookup, a record lookup, or an automated lookup. Subsequently, a business logic that was originally used to initiate the generation of the service fees for the set of subscribers by one or more billing systems based on the affected CDRs may be modified. Such modification may be performed using a CDR reprocessing tool of the re-rating engine. Once the business logic is modified, the CDR reprocessing tool may use the modified business logic to initiate the generation of reprocessed CDRs that correspond to the affected CDRs. The reprocessed CDRs are then sent to the one or more billing systems according to the business logic to trigger the recalculation of the service fees for the set of subscribers.

In various embodiments, the services fees of the subscribers may have to be recalculated for a set of subscribers because of an initial error in the business logic, because of configuration errors or failures of the billing systems, because the wireless carrier network wants to provide discounted service or free service to subscribers affected by a disaster, or because of some other anomalous event occurred.

Thus, the re-rating engine may provide an administrator of the wireless carrier network with an efficient way to identify and modify large batches of CDRs (e.g., hundreds of thousands CDRs) so that service fees can be expediently recalculated following an anomalous event. The techniques described herein may be implemented in a number of ways. Example implementations are provided below with reference to the following figures.

Example Architecture

Figure 1:
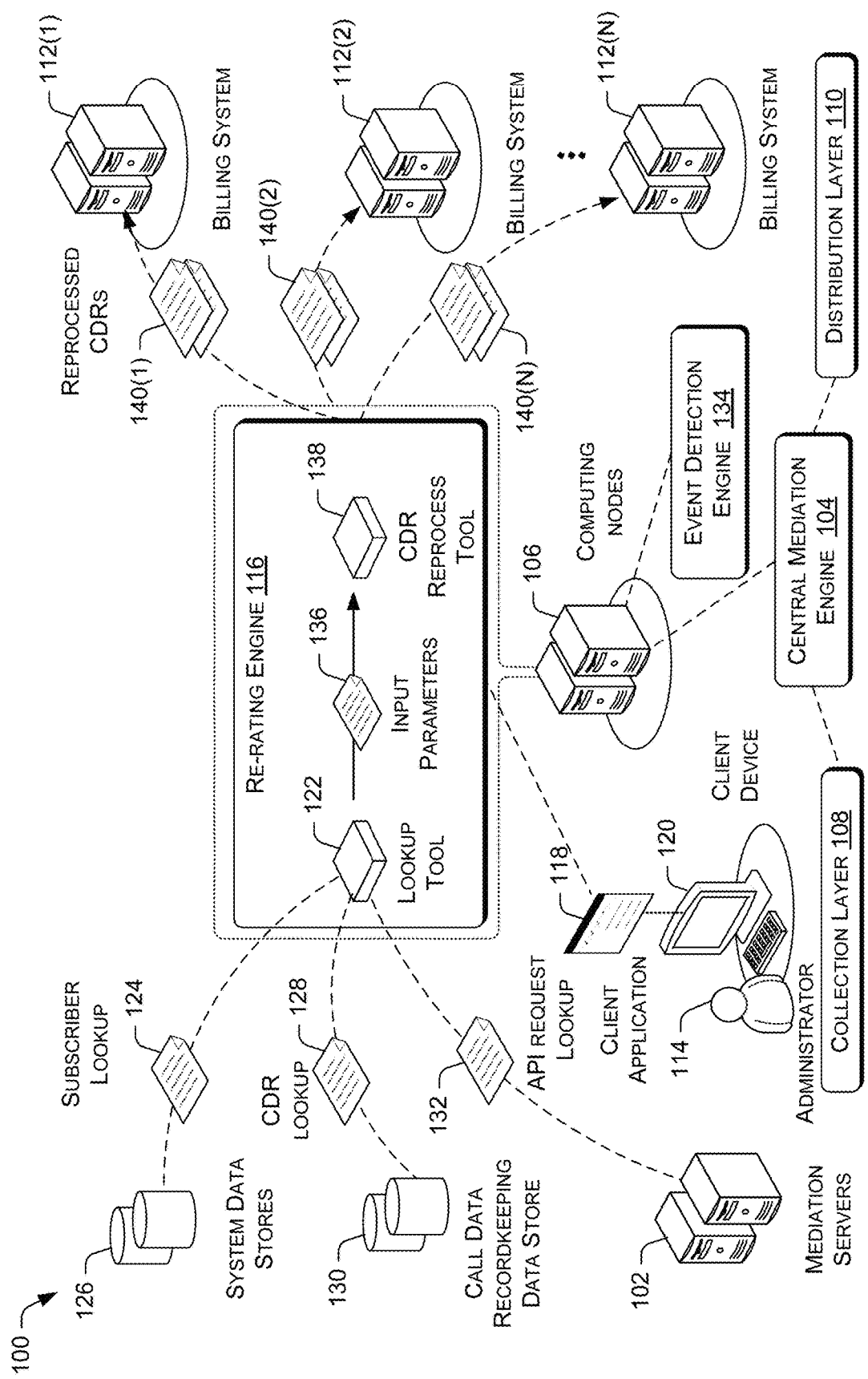
FIG. 1 illustrates an example architecture that enables the use of a re-rating engine to initiate the re-rating of service fees for subscribers by the billing systems of a wireless carrier network.

FIG. 1 illustrates an example architecture 100 that enables the use of a re-rating engine to initiate the re-rating of service fees for subscribers by the billing systems of a wireless carrier network. The architecture 100 illustrates selected network components of a wireless carrier network. In various embodiments, the wireless carrier network may include a core network and a radio access network. The radio access network may include multiple base stations. Each base station may include a base transceiver system (BTS) that communicates via an antenna system over an air-link with one or more user devices that are within range. The BTS may send radio communication signals to user devices and receive radio communication signals from user devices. The base stations may provide corresponding network cells that deliver telecommunication and data communication coverage to user devices. The user devices may include a smartphone, a tablet computer, an embedded computer system, or any other device that is capable of using the wireless communication services that are provided by the wireless carrier network.

The core network may use the network cells to provide wireless communication services to the user devices. The core network may include components that support 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network. The EPC may include a Mobility Management Entity (MME). The MME may handle paging, authentication, and registration of user devices, as well as the routing of data and voice communications through selected gateways.

The wireless carrier network may further include mediation servers 102 that generate call detail records (CDRs) for various network components that provide wireless telecommunication services to subscribers. For example, the mediation servers 102 may be parts of Charge and Control nodes (CCNs), Operations Control Centers (OCCs), IP Multimedia Subsystems (IMSs), Affinity Network Fusion (ANF) components, Similarity Network Fusion (SNF) components, and/or so forth. For example, a first mediation server may generate CDRs related to the use of 5G voice calls by subscribers, a second mediation server may generate CDRs related to the upload/download data via the wireless carrier network by subscribers, a third mediation server may generate CDRs related to the sending/receiving of text or multimedia message by subscribers, and/or so forth. In some instances, mediation servers may be responsible for generating CDRs for not only subscribers of the wireless carrier network, but also subscribers of mobile virtual network operators (MVNO) that provide telecommunication services to their subscribers via the wireless carrier network.

In operation, a central mediation engine 104 that is executed by one or more computing devices 106 of the wireless carrier network may use a collection layer 108 to collect the CDRs from the mediation servers 102. One example of the central mediation engine 104 is the Ericsson Multi-Mediation (EMM) engine developed by Telefonaktiebolaget LM Ericsson (Ericsson) of Stockholm, Sweden. The collection layer 108 may include corresponding collector applications that interact with the mediation servers to retrieve the CDRs from the mediation servers 102. For example, a collector application may be configured to navigate to a CDR data store of a mediation server via a corresponding collection path (e.g., a file directory path) and retrieve the CDRs at designated dates and times according to a set of configuration parameters. Such configuration parameters for the retrieval of the CDRs by the collector application may be stored in a business logic that is implemented by the central mediation engine 104. The retrieval of the CDRs may be accomplished using file transfer protocol (FTP), SSH file transfer protocol (SFTP), Hypertext Transfer Protocol (HTTP) posts, direct network infrastructure element connection, and/or other data transfer techniques.

In some embodiments, the CDRs may be processed by the collector applications following retrieval from the mediation servers. For example, the processing of the CDRs may include reformatting the CDRs, filtering out specific data from the CDRs, or adding additional data to the CDRs. Accordingly, the collector applications may process the CDRs according to configuration parameters specified by a business logic that is implemented by the central mediation engine 104. The processed CDRs are then sent by the central mediation engine 104 via a distribution layer 110 to one or more billing systems, such as the billing systems 112(1)-112(N).

The distribution layer 110 may include corresponding distribution applications that deliver retrieved and/or processed CDRs to one or more of the billing systems 112(1)-112(N). In turn, the one or more billing systems 112(1)-112(N) may generate bills of service fees to be charged to subscribers. For example, a distribution application may be configured to send a set of corresponding CDR from a specific mediation server to a data store of a particular billing system at particular dates and times via a destination path (e.g., a file directory path) according to one or more configuration parameters. Such configuration parameters related to the distribution of the CDRs by the collector application may be stored in the business logic that is implemented by the central mediation engine 104. In various embodiments, a business logic may be in the form of a configuration file that stores various configuration parameters. The configuration parameters may be encoded by any data format, such as Extensible Markup Language (XML). In this way, a business logic may store configuration parameters related to retrieving CDRs from one or more specific mediation servers, processing the CDRs into specific data formats, and delivering the CDRs to one or more specific billing systems.

In some scenarios, an administrator 114 of the wireless carrier network may need to modify the service fees that are charged to particular subscribers. For example, the services fees may have to be recalculated for a set of subscribers because of an initial error in the business logic, because of configuration errors or failures of the billing systems, because the wireless carrier network wants to provide discounted service or free service to subscribers affected by a disaster, or because of some other anomalous event occurred. In some instances, the anomalous event may result in a customer billing complaint (e.g., text or call to customer service) that is ultimately routed to the administrator. In other instances, the anomalous event may result in an automated system alarm that notifies the administrator of the event. In such scenarios, the administrator 114 may use a re-rating engine 116 that is executed by the one or more computing devices 106 to perform the modification of the service fees. The administrator 114 may use a client application 118 on a client device 120 to interact with the re-rating engine 116. The re-rating engine 116 may provide application user interfaces that are accessible via the client application 118. The application user interfaces may be web pages or interface pages that are accessible via the client application 118. For example, the web pages may be in the form of HyperText Markup Language (HTML) documents, in which the documents may include text content, images, multimedia content, cascade style sheets (CSS), and/or scripts that are accessible via a web browser. In some embodiments, the re-rating engine 116 may use an application server that supports server-side scripting via multiple scripting languages, such as Active Server Pages (ASP), Hypertext Preprocessor (PHP), JavaScript, and other scripting languages to support the dynamic generation of web pages that presents output and receives input from a user.

Accordingly, the administrator 114 may use a lookup tool 122 of the re-rating engine 116 to query for CDRs that match one or more query criteria. A CDR may contain fields that are organized in a structured manner to provide information regarding a communication session that occurred. For example, A CDR for a voice call may include a first field that contains a MSISDN of a caller, a second field that contains a MSISDN of a callee, a third field that contains a date and time that the voice call is made, and a fourth field that contains a call duration, and/or so forth. The various fields in the CDR may be parsed and viewed via a formatter function in the business logic. The one or more query criteria may correspond to one or more characteristics of an anomalous event that occurred. For example, the query criteria may include a particular date range and one or more search attributes, such as account type, service class, alarm identifier, and/or so forth. In some instances, the lookup tool 122 may be used to perform a subscriber lookup 124 to retrieve subscriber identifiers (e.g., MSISDNs) of subscribers that are impacted by an anomalous event from system data stores 126. The system data stores 126 may include data stores that are maintained by the billing, tariff, and/or rating systems of the wireless carrier network. In other instances, the lookup tool 122 may be used to perform a CDR lookup 128 to retrieve CDR identifiers (e.g., CDR file names) of CDRs that correspond to an anomalous event from a call data recordkeeping data store 130. For example, a CDR file identified by a CDR identifier may contain the CDRs that are collected by a collector on a particular day. The call data recordkeeping data store 130 may be a data archive store that is configured to archive CDRs of the wireless carrier network. The call data recordkeeping data store 130 may be configured to store each CDR for a predetermined period of time (e.g., three months) before the CDR is purged from the data archive store by a data maintenance function of the call data recordkeeping data store 130.

In additional instances, the lookup tool 122 may be used to perform an application program interface (API) request lookup 132 to retrieve subscriber identifiers of subscribers and/or CDR identifiers of CDRs that are related to an alarm event from the data stores of the mediation servers 102. For example, the alarm event may be an anomalous event that is automatically detected by an event detection engine 134 executing on the one or more computing devices 106. The event detection engine 134 may be an application that monitors various rating, billing, and tariff components of the wireless carrier networks for failures related to the generation of CDRs and bills for subscribers. Such failures may include software failures (e.g., such as failures due to the execution of faulty software code or faulty configuration settings) and/or hardware failures, such as malfunction of servers that execute software. Accordingly, the API request lookup 132 may be used to retrieve subscriber identifiers and/or CDR identifiers that correspond to different alarm events.

Following the retrieval of the subscriber identifiers and/or CDR identifiers that are related to an anomalous event via the lookup tool 122, the administrator 114 may use the lookup tool 122 to export the subscriber identifiers and/or CDR identifiers as input parameters 136 to a CDR reprocessing tool 138 of the re-rating engine 116 to initiate a reprocessing of the corresponding CDRs. The reprocessed CDRs, such as the reprocessed CDRs 140(1)-140(N), are then sent to the respective billing systems, such as the billing systems 112(1)-112(N), may perform re-rating to recalculate service fees for the subscriber that are affected by the anomalous event.

In various embodiments, the CDR reprocess tool 138 may provide multiple application user interfaces that enable the administrator 114 to control the reprocessing of a set of CDRs. The application user interfaces may provide menus, icons, selection boxes, selection buttons, and/or other interface elements to receive input from the administrator 114 and output information to the administrator 114. The set of CDRs may include CDRs that are identified by the CDR identifiers or related to the subscriber identifiers that are exported by the lookup tool 122. Accordingly, the CDR reprocess tool 138 may be used by the administrator 114 to import a business logic that is used to generate the set of CDRs. The business logic may be visually presented by the CDR reprocess tool 138 to the administrator 114 via a logic tree diagram, in which the relationship between functions (e.g., filter function, format function, etc.), sub-functions of the functions, configuration parameters for the functions and/or sub-functions, and related sub-configuration parameters in the business logic are presented as interconnected and/or hierarchical branches and nodes. Alternatively, the business logic may be presented by the CDR reprocess tool 138 in text form as a script that contains configuration codes that correspond to the functions, sub-functions, configuration parameters, and sub-configuration parameters.

Subsequently, the CDR reprocess tool 138 may receive a selection of one or more data collector applications of a plurality of data collector applications that are listed in the business logic. The selection may be inputted by the administrator 114 via an application user interface. In various instances, the administrator 114 may select the one or more data collector applications based on the knowledge the administrator 114 possesses regarding the network architecture of the wireless carrier network. For example, the administrator 114 may select collector applications that are associated with specific CCNs, OCCs, etc. In another example, the administrator 114 may select collector applications of network components that service particular categories of subscribers, such as the subscribers of an MVNO that is affiliated with the wireless carrier network.

Following the selection, the CDR reprocess tool 138 may determine whether a specific group of CDRs is currently archived in a data archive store of the wireless carrier network, such as the call data recordkeeping data store 130. For example, the specific group of CDRs may be CDRs that have been identified by the administrator 114 using the lookup tool 122 as to be re-rated. These CDRs may be identified to the CDR reprocess tool 138 via CDR identifiers imported from the lookup tool 122. Alternatively, These CDRs may be identified to the CDR reprocess tool 138 via corresponding subscriber identifiers imported from the lookup tool 122. In such alternative instances, the CDR reprocess tool 138 may use an identification function to identify CDRs that contain service usage details for the subscribers identified by the imported subscriber identifiers. The specific group of CDRs must be archived in the data archive store in order for the CDR reprocess tool 138 to perform the reprocessing. Thus, if the specific group of CDRs is present in the data archive store, the administrator 114 may use the CDR reprocess tool 138 to optionally modify one or more CDR location paths to the specific group of CDRs in the data archive store by inputting one or more one or more inputted CDR location path modifications. A CDR location path may be a network file directory path to a file location where at least one particular CDR is stored. For example, the administrator 114 may recognize from prior knowledge that a CDR location path is incorrect and input the corrective CDR location path modification. The one or more modified CDR location paths are then stored in the business logic by the CDR reprocessing tool.

Additionally, the CDR reprocess tool 138 may receive one or more parameter updates for the one or more configuration parameters in the business logic, in which the one or more parameter updates are inputted by the administrator 114. The one or more parameter updates may cause the CDR reprocess tool 138 to modify the configuration parameters in the business logic so that the resultant reprocessed CDRs will eventually cause a billing system to modify the service fees charged to subscribers as compared to the previously processed CDRs. For example, a parameter update may change a type of service designation for a telecommunication service usage session detailed in the CDRs, and another parameter update may adjust a date and/or time of a telecommunication service usage session detailed in the CDRs. These and other parameter updates may be used to adjust a service fee (e.g., increase, reduced, or zeroed-out) for a telecommunication service usage session of a subscriber, or adjust a service fee charged to the subscriber for a particular type of wireless telecommunication service.

Along with the modifications of the configuration parameters in the business logic, the CDR reprocess tool 138 may further receive a selection of one or more CDR distribution applications of a plurality of CDR distributor applications listed in the business logic. The selection may be inputted by the administrator 114 via an application user interface. In various instances, the administrator 114 may select the one or more CDR distributor applications based on the knowledge the administrator 114 possesses regarding the network architecture of the wireless carrier network. For example, the administrator 114 may select CDR distributor applications that distribute CDRs to specific billing systems, such as billing systems that generate service fees for specific network components or categories of subscribers. In some instances, the data destination paths used by the one or more selected CDR distributor applications to send CDRs to the corresponding billing systems, which are stored in the business logic, may be optionally modified. A data destination path may be a network file directory path to a file location where the CDRs are subsequently retrieved and accessed by the billing system. For example, the administrator 114 may recognize from prior knowledge that a data destination path is incorrect and input a corrective CDR location path modification.

In some instances, the CDR reprocess tool 138 may further filter out one or more of the CDRs from the specific group of CDRs before reprocessing. In such instances, the CDR reprocess tool 138 may select a particular set of CDRs in the specific group of CDR based on one or more inputted selection parameters, in which the particular set of CDRs may correspond to a particular set of subscribers. The selection parameters may be inputted by the administrator 114 via an application user interface of the CDR reprocess tool 138. The inputted selection parameters may be used by a filter function of the business logic to filter out CDRs that do not meet the inputted selection parameters. For example, the selection parameters may include a CDR date and time range, a range of subscriber identifiers (MSISDNs), a range of subscriber identifiers (MSISDNs) with certain characteristics (e.g., active, inactive), identifiers of CDRs and/or subscribers that correspond to one or more specific alarm events, a list of specific subscriber identifiers that is imported into the tool, a list of specific CDR identifiers that is imported into the tool, and/or so forth. These selections and modifications may result in an updated business logic that is used for generating reprocessed CDRs.

Subsequently, the CDR reprocess tool 138 may be activated via an application user interface to generate the reprocessed CDRs using the updated business logic. For example, the administrator 114 may use an activation button on the application user interface to initiate the reprocessing. Following activation, the CDR reprocess tool 138 may direct the one or more selected collector applications to retrieve and access the particular set of CDRs via the one or more data collection paths such that the collector applications may reprocess the CDRs according to at least the one or more updated configuration parameters in the business logic. In various embodiments, the selected collector applications may use the updated configuration parameters in the updated business logic to format and generate the reprocessed CDRs. The reprocessed CDRs are then sent by the one or more selected CDR distributor applications as directed by the updated business logic to the one or more billing systems. In turn, the reprocessed CDRs may trigger recalculation of the service fees charged to the particular set of subscribers by the one or more billing systems based at least on the reprocessed CDRs.

Example Computing Device Components

Figure 2:
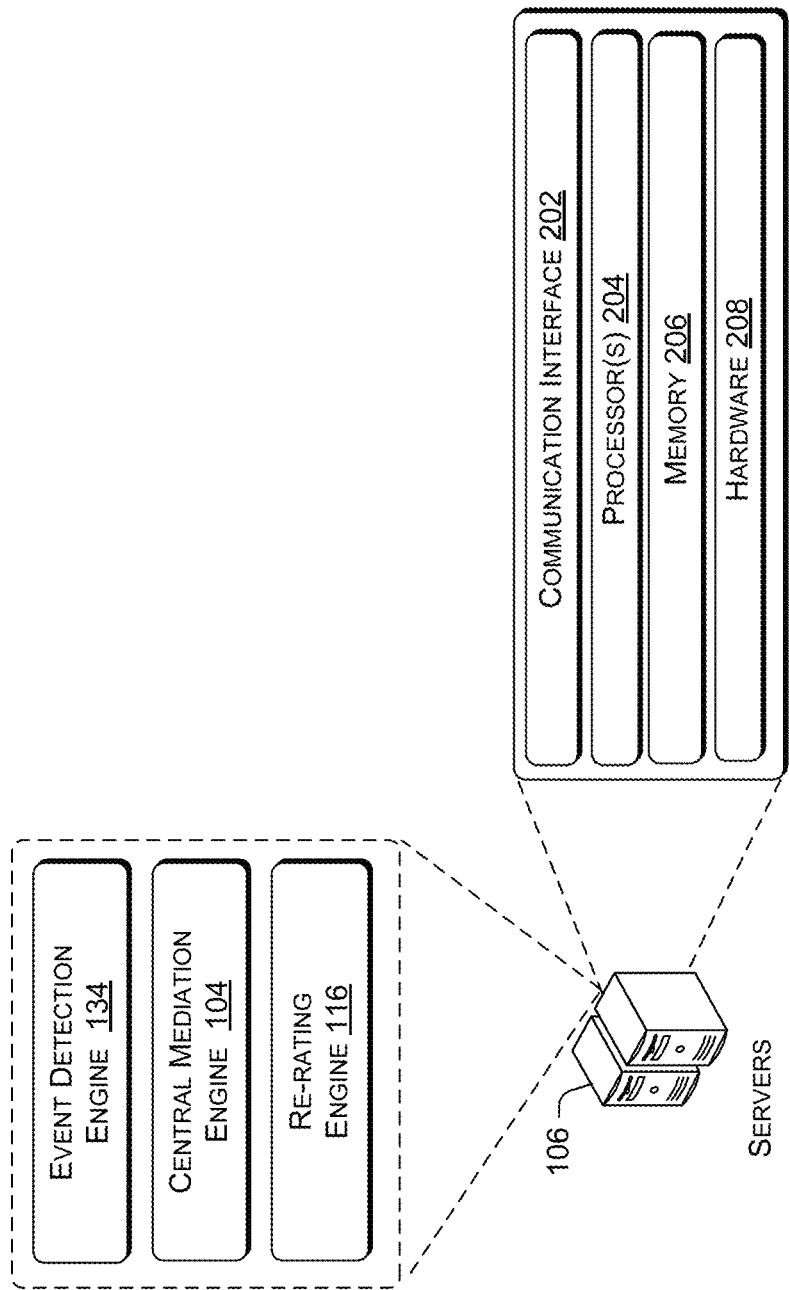
FIG. 2 is a block diagram showing various components of one or more computing devices that support the implementation of a re-rating engine that is capable of initiating the re-rating of service fees for subscribers by the billing systems of a wireless carrier network.

FIG. 2 is a block diagram showing various components of one or more computing devices that support the implementation of a re-rating engine that is capable of initiating the re-rating of service fees for subscribers by the billing systems of a wireless carrier network. The computing devices 106 may include a communication interface 202, one or more processors 204, memory 206, and hardware 208. The communication interface 202 may include wireless and/or wired communication components that enable the computing devices 106 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 106 or components thereof may be virtual computing devices in the form of virtual machines or software containers that are hosted in a computing cloud.

The computing devices 106 may implement various back-end services and components of the wireless carrier network that are associated with performing re-rating, such as the re-rating engine 116, the event detection engine 134, and the central mediation engine 104. The implementation involves the execution of software, applications, and/or modules that include routines, program instructions, code segments, objects, and/or data structures that perform particular tasks or implement particular abstract data types. Further, the various data stores of the wireless carrier network may include databases that are implemented in the computing cloud or on-premise in one or more facilities of the wireless carrier network.

Example Application User Interfaces

Figure 3A:
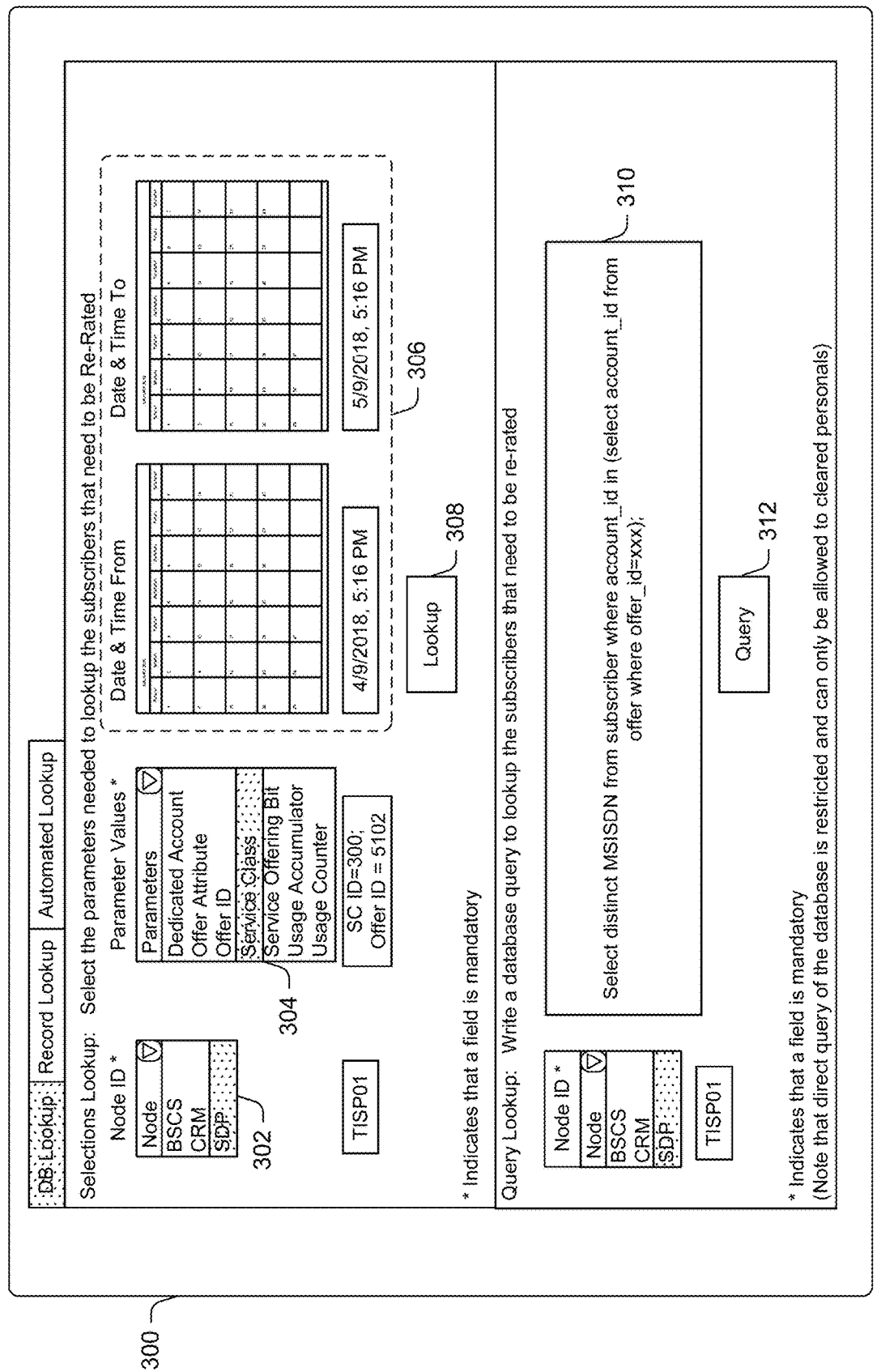
FIG. 3a illustrates an example database query interface provided by a lookup tool of the re-rating engine for querying a database for lists of subscriber identifiers that are affected by an anomalous event.

FIG. 3a illustrates an example database query interface provided by a lookup tool of the re-rating engine for querying a database for lists of subscriber identifiers that are affected by an anomalous event. The database query interface 300 may enable a subscriber lookup of subscriber identifiers (e.g., MSISDNs) from a data store of the wireless carrier network based on one or more inputted query parameters. For example, the query parameters that can be selected from multiple available options may include a specific node identifier 302, a specific telecommunication service parameter value 304, and/or a specific date range 306. Following the input of various query parameters, the user may activate a query button 308 to direct the lookup tool 122 to execute the query. The database query interface 300 may further include a query writeup area 310 that enables a user to compose a custom database query for specific subscriber identifiers. Following the input of a custom query, the user may activate a query button 312 to direct the lookup tool 122 to execute the query. Accordingly, the database query interface 300 may enable the administrator 114 to look up subscriber identifiers of subscribers that are affected by an anomalous event via one or more inputted query parameters that the administrator 114 knows are associated with the event.

Figure 3B:
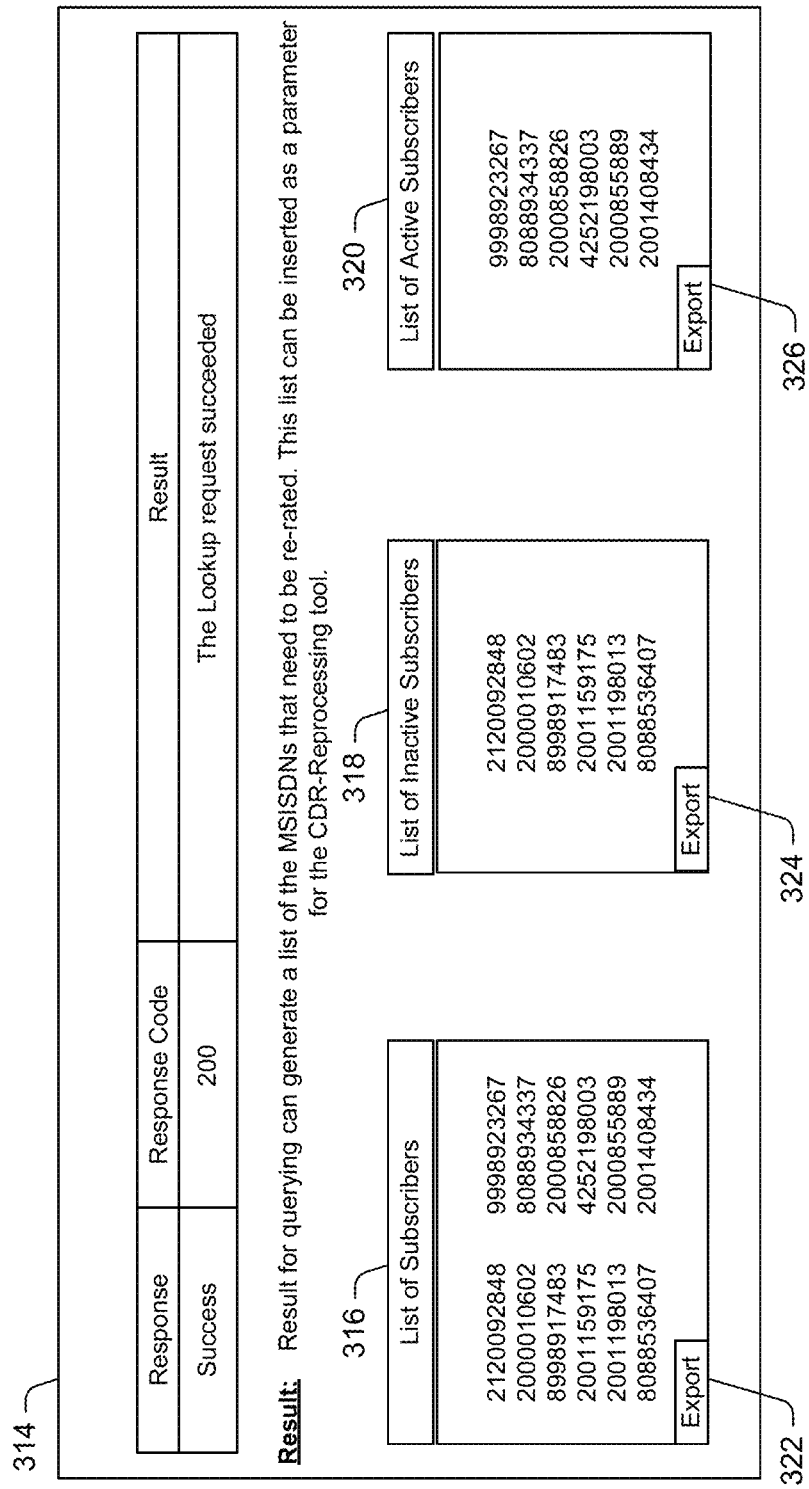
FIG. 3b illustrates an example database query result interface provided by the lookup tool of the re-rating engine that presents a list of subscriber identifiers for exporting to a CDR reprocessing tool such that reprocessed CDRs can be generated for the list of sub scriber identifiers.

FIG. 3b illustrates an example database query result interface provided by the lookup tool of the re-rating engine. The database query result interface 314 may be presented by the lookup tool 122 following the execution of a database query. The database query result interface 314 may show one or more lists of subscriber identifiers (e.g., MSISDNs) of subscribers that match the query parameters of the database query. For example, the lists may include an overall list of subscribers 316, a list of inactive subscribers 318, and a list of active subscribers 320. The windows that present the lists 316, 318, and 320 may be equipped with corresponding export buttons 322, 324, and 326. Thus, the activation of an export button may cause the lookup tool 122 to export a corresponding list of subscriber identifiers to the CDR reprocessing tool 138 such that reprocessed CDRs may be generated.

FIG. 4a illustrates an example record query interface provided by the lookup tool of the re-rating engine for querying a database for a list of CDRs that are affected by an anomalous event. The record query interface 400 may enable a record lookup of CDR identifiers (e.g., CDR file names) from a data store of the wireless carrier network based on one or more inputted query parameters. For example, the query parameters that can be selected from multiple available options may include a specific server/node identifier 402, a specific CDR name 404, a specific directory path 406 where the CDR are located, and a specific date range 408. Following the input of various query parameters, the user may activate a query button 410 to direct the lookup tool 122 to execute the query. Accordingly, the record query interface 400 may enable the administrator 114 to look up CDR identifiers of CDRs that are affected by an anomalous event via one or more inputted query parameters that the administrator 114 knows are associated with the event.

FIG. 4b illustrates an example record query result interface provided by the lookup tool of the re-rating engine. The record query result interface 412 may be presented by the lookup tool 122 following the execution of a record query. The record query result interface 412 may show one or more lists of CDR identifiers (e.g., file names) that match the query parameters of the database query in a query result window 414. The query result window 414 may be configured to enable a user to select one or more CDR identifiers. Following the selection of the one or more CDR identifiers, the user may activate an export button 416 to export the one or more selected CDR identifiers to the CDR reprocessing tool 138, such that reprocessed CDRs may be generated for at least some of the CDRs identified by the one or more selected CDR identifiers.

Figure 5A:
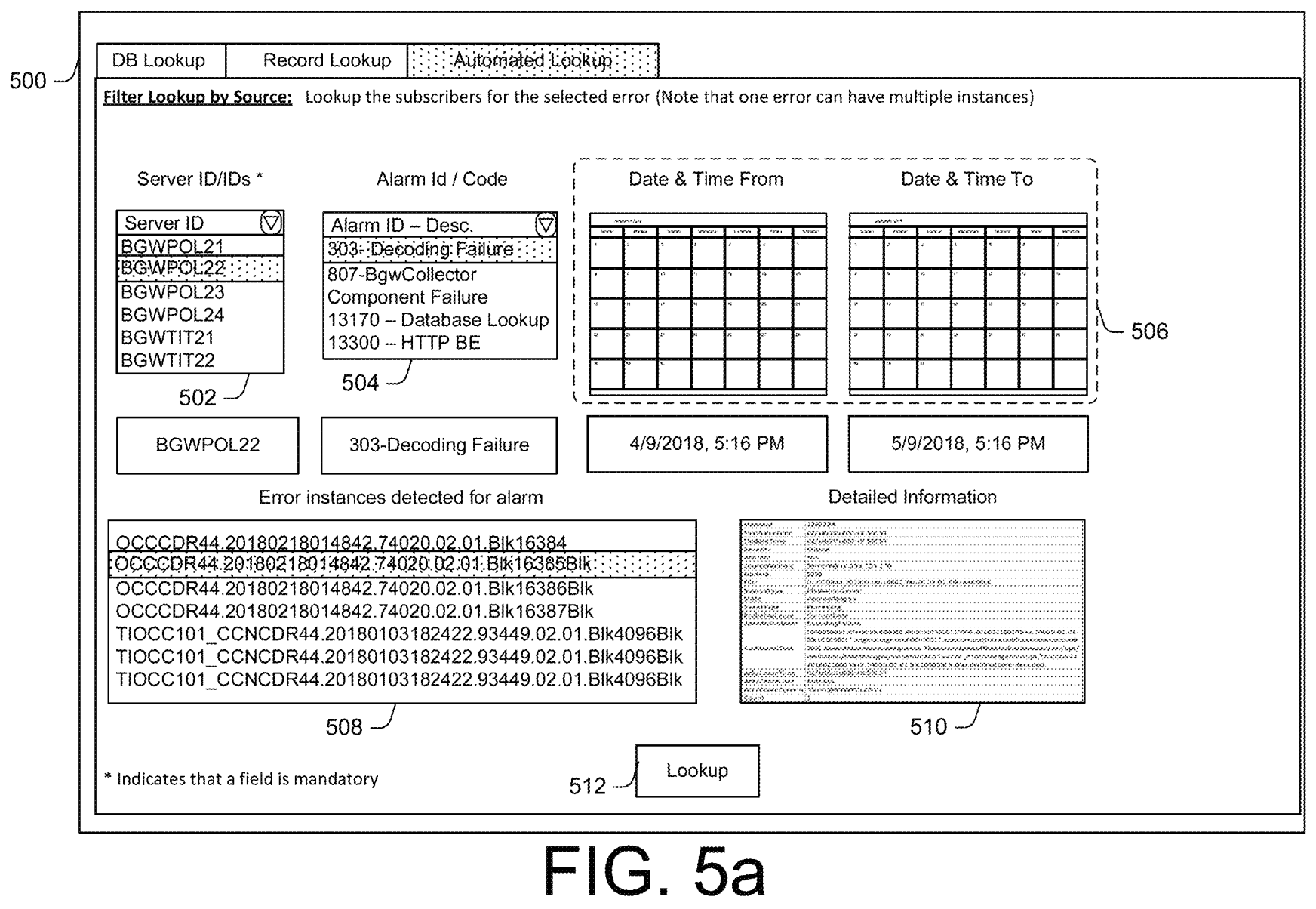

FIG. 5a illustrates an example automated query interface provided by the lookup tool of the re-rating engine for querying a database for a list of subscriber identifiers or a list of CDRs that are affected by an anomalous event. The automated query interface 500 may enable a lookup of subscriber identifiers (e.g., MSISDNs) and/or CDR identifiers (e.g., CDR file names) that are associated with an alarm event from a data store of the wireless carrier network based on one or more inputted query parameters. For example, the query parameters that can be selected from multiple available options may include a specific server identifier 502, an alarm identifier/code identifier 504, and a specific date range 506. The selection of a specific alarm identifier/code identifier may cause an error instance window 508 to show multiple error instances that are associated with an alarm. The error instance window 508 may further enable a user to select a specific error instance file so that additional detailed information regarding the error instance may be presented in the detail information window 510. Further, following the selection of the error instance file, the user may activate a query button 512 to direct the lookup tool 122 to execute a query on the error instance.

Figure 5B:
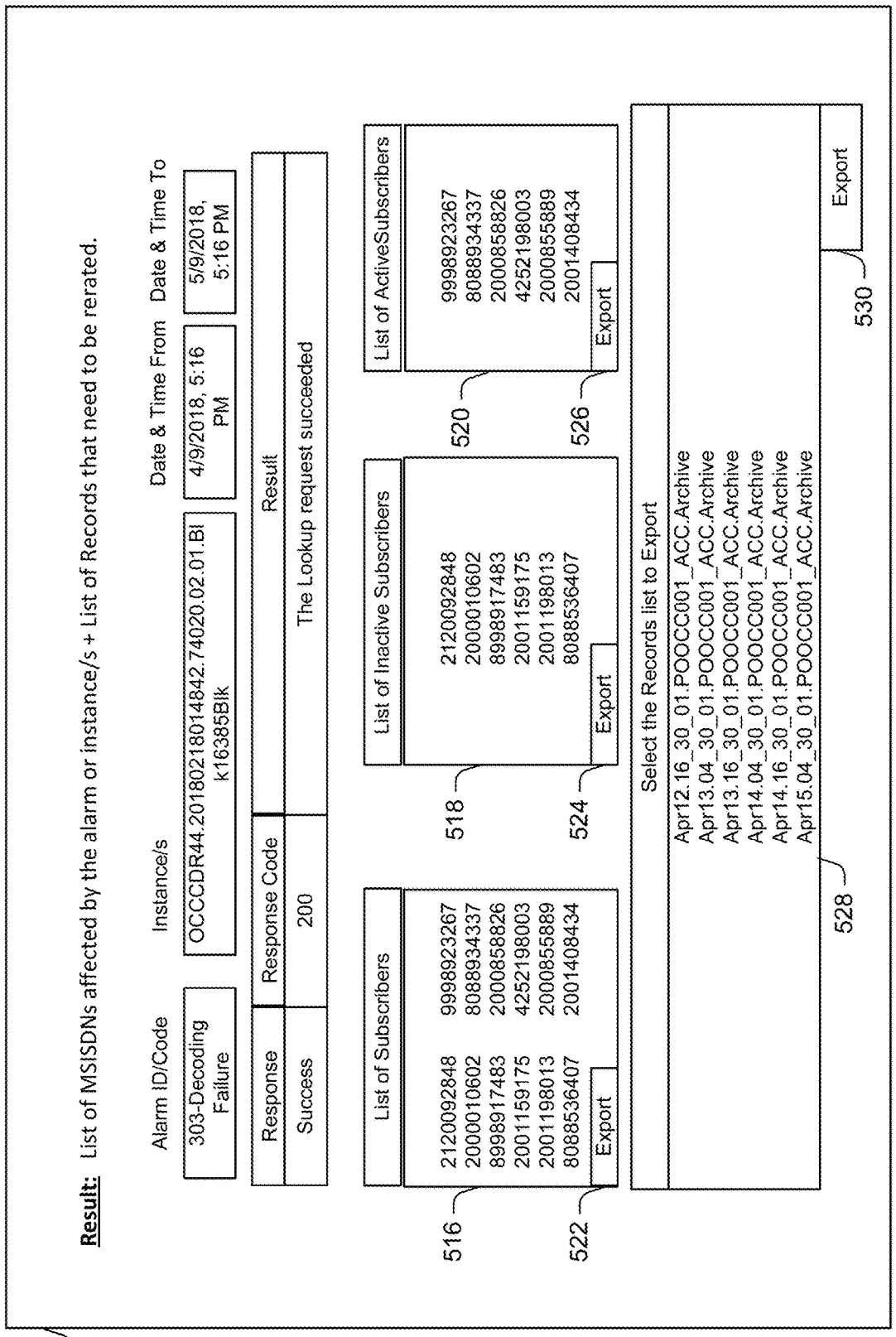
FIG. 5b illustrates an example automated query result interface provided by the lookup tool of the re-rating engine that presents the list of subscriber identifiers or the list of CDRs for exporting to the CDR reprocessing tool such that reprocessed CDRs can be generated.

FIG. 5b illustrates an example automated query result interface provided by the lookup tool of the re-rating engine. The automated query result interface 514 may be presented by the lookup tool 122 following the execution of a query via the automated query interface. The query result interface 514 may show one or more lists of subscriber identifiers (e.g., MSISDNs) of subscribers that match the query parameters of the database query. For example, the lists may include an overall list of subscribers 516, a list of inactive subscribers 518, and a list of active subscribers 520. The windows that present the lists 516, 518, and 520 may be equipped with corresponding export buttons 522, 524, and 526. Thus, the activation of an export button may cause the lookup tool 122 to export a corresponding list of subscriber identifiers to the CDR reprocessing tool 138 such that reprocessed CDRs may be generated for the corresponding list.

Additionally, the automated query result interface 514 may show one or more lists of CDR identifiers (e.g., file names) that match the query parameters of the database query in a CDR list window 528. The CDR list window 528 may be configured to enable a user to select one or more CDR identifiers. Following the selection of the one or more CDR identifiers, the user may activate an export button 530 to export the one or more selected CDR identifiers to the CDR reprocessing tool 138, such that reprocessed CDRs may be generated for at least some of the CDRs identified by the one or more selected CDR identifiers.

Example Processes

Figure 6:
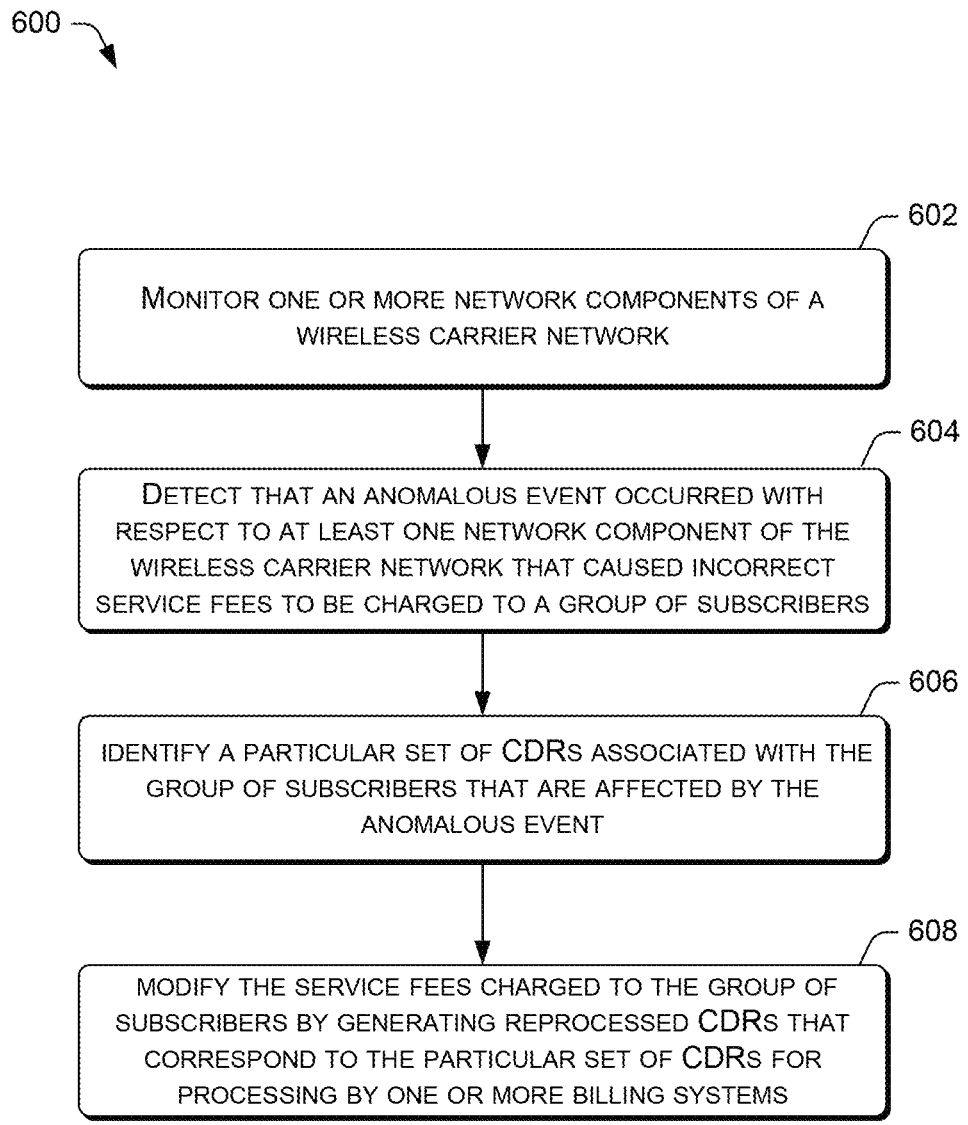
FIG. 6 is a flow diagram of an example process for monitoring one or more network nodes of a wireless carrier network to detect an anomalous event.
Figure 7A:
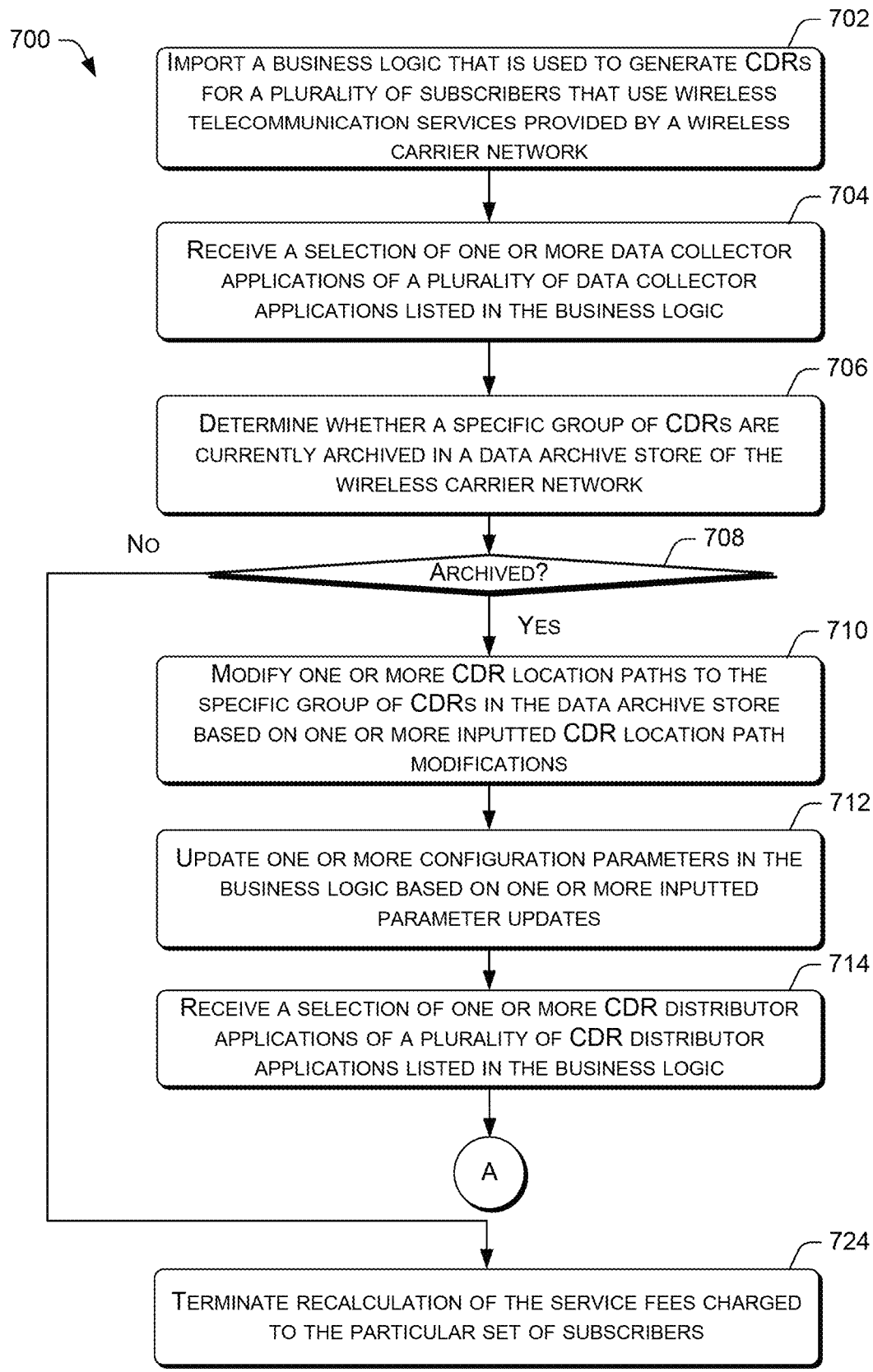
FIGS. 7a and 7b illustrate a flow diagram of an example process for using a re-rating engine to initiate the re-rating of service fees for subscribers by the billing systems of a wireless carrier network.
Figure 7B:
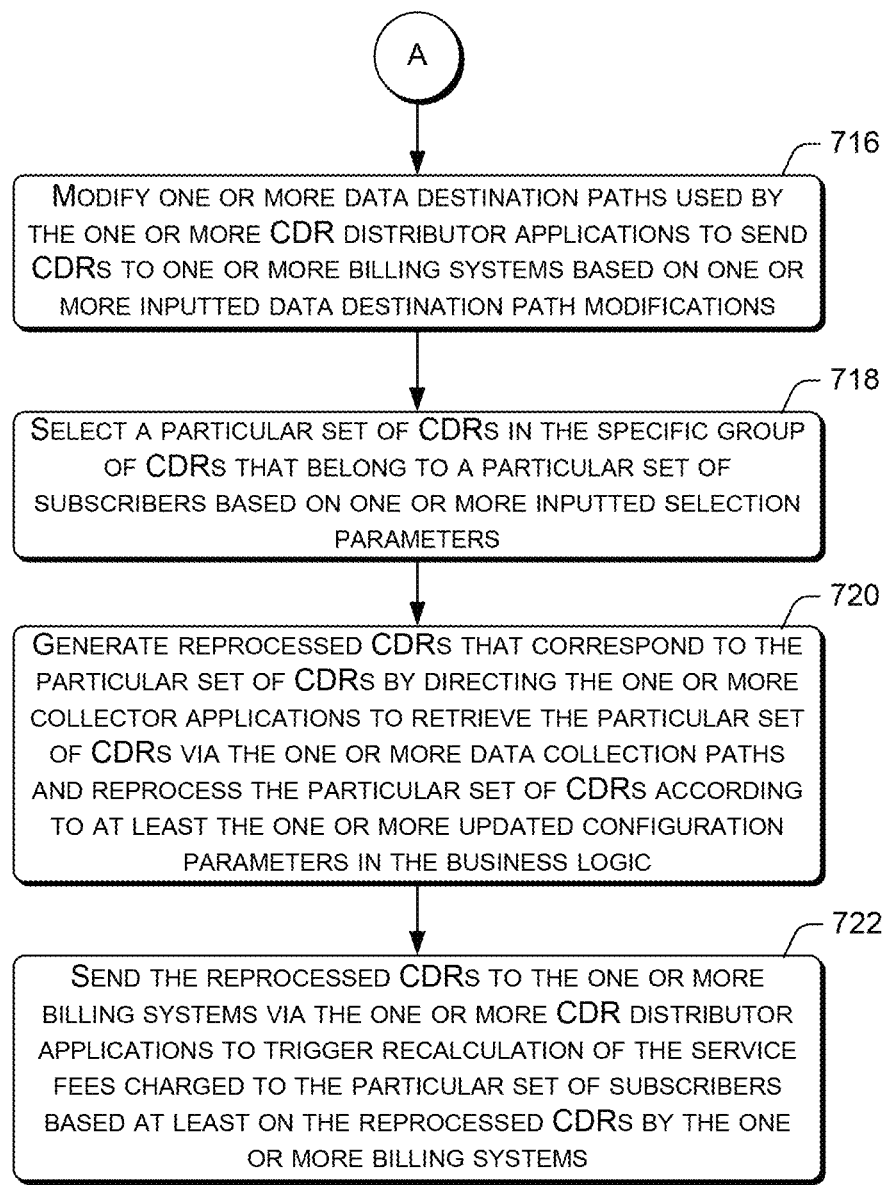

FIGS. 6, 7*a*, and 7*b* present illustrative processes 600 and 700 for initiating the re-rating of service fees for subscribers by the billing systems of a wireless carrier network. Each of the processes 600 and 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 and 700 are described with reference to the architecture 100 of FIG. 1.

FIG. 6 is a flow diagram of an example process 600 for monitoring one or more network nodes of a wireless carrier network to detect an anomalous event. At block 602, an event detection engine 134 may monitor one or more network components of a wireless carrier network. The event detection engine 134 may be an application that monitors various rating components of the wireless carrier networks for failures related to the generation of CDRs and bills for subscribers. Such failures may include software failures (e.g., such as failures due to the execution of faulty software code or faulty configuration settings) and/or hardware failures, such as malfunction of servers that execute software.

At block 604, the event detection engine 134 may detect that an anomalous event occurred with respect to at least one network component of the wireless carrier network. For example, the detection of the anomalous event may cause the event detection engine 134 to generate an alarm event that is identifiable via one or more error instances. At block 606, the re-rating engine 116 may identify a particular set of CDRs associated with the group of subscribers that are affected by the anomalous event. In various embodiments, the particular set of CDRs may be identified via CDR identifiers that are associated with one or more error instances, or corresponding subscriber identifiers that are associated with the one or more error instances. The identification of the particular set of CDRs may be performed automatically by the re-rating engine 116 or based on query parameters inputted via the client application 118.

At block 608, the re-rating engine 116 may modify the service fees charged to the group of subscribers by generating reprocessed CDRs that correspond to the particular set of CDRs for processing by one or more billing systems. In various embodiments, the block 608 may be implemented via the re-rating engine 116 for a group of subscribers for reasons other than the detection of an anomalous event internal to the wireless carrier network. For example, the modification may be implemented due to an occurrence of a natural disaster that negatively impacts the group of subscribers, and the wireless carrier may decide to provide discounted or free telecommunication services for a specific period of time to the group of subscribers.

FIGS. 7*a* and 7*b* illustrate a flow diagram of an example process 700 for using a re-rating engine to initiate the re-rating of service fees for subscribers by the billing systems of a wireless carrier network. The process 700 may further illustrate block 608 of the process 600. At block 702, the re-rating engine 116 may import a business logic that is used to generate CDRs for a plurality of subscribers that use wireless telecommunication services provided by a wireless carrier network. In various embodiments, the business logic may be in the form of a configuration file that stores various configuration parameters. At block 704, the re-rating engine 116 may receive a selection of one or more data collector applications of a plurality of data collector applications listed in the business logic. In various embodiments, the data collector applications may be included in a collector layer and are configured to retrieve CDRs from data stores of various servers, such as mediation servers, and process them according to the configuration parameters in the business logic.

At block 706, the re-rating engine 116 may determine whether a specific group of CDRs are currently archived in a data archive store of the wireless carrier network. The data archive store may be configured to store a set of CDRs for a predetermined period of time (e.g., three months) before the set of CDRs is purged from the data archive store by a data maintenance function of the data archive store.

At decision block 708, if the specific group of CDRs is currently archived in the data archive store of the wireless carrier network ("yes" at decision block 708), the process 700 may proceed to block 710. At block 710, the re-rating engine 116 may modify one or more CDR location paths to the specific group of CDRs in the data archive store based on one or more inputted CDR location path modifications. The block 710 may be optional and the one or more CDR location paths are not modified by the re-rating engine 116 when the re-rating engine 116 does not receive any CDR location path modification inputs.

At block 712, the re-rating engine 116 may update one or more configuration parameters in the business logic based on one or more inputted parameter updates. For example, a parameter update may change a type of service designation for the telecommunication service usage session detailed in the CDRs, another parameter update may adjust a date and/or time of the telecommunication service usage session detailed in the CDRs, and/or so forth.

At block 714, the re-rating engine 116 may receive a selection of one or more CDR distributor applications of a plurality of CDR distributor applications listed in the business logic. The one or more CDR distribution applications may be included in a distributor layer and are configured to deliver the retrieved and/or processed CDRs to one or more of the billing systems. At block 716, the re-rating engine 116 may modify one or more data destination paths used by the one or more CDR distributor applications to send CDRs to one or more billing systems based on one or more inputted data destination path modifications. The block 716 may be optional and the one or data destination paths are not modified by the re-rating engine 116 when the re-rating engine 116 does not receive any data destination path modification inputs.

At block 718, the re-rating engine 116 may select a particular set of CDRs in the specific group of CDRs that belong to a particular set of subscribers based on one or more inputted selection parameters. For example, the selection parameters may include a CDR date and time range, a range of subscriber identifiers (MSISDNs) with certain characteristics (e.g., active, inactive, etc.), CDRs or subscribers that correspond to one or more specific alarm events, a list of specific subscriber identifiers that is imported into the tool, a list of specific CDR identifiers that is imported into the tool, and/or so forth.

At block 720, the re-rating engine 116 may generate reprocessed CDRs that correspond to the particular set of CDRs by directing one or more collector applications to retrieve the particular set of CDRs from the data archive store via the one or more data collection paths and reprocess the particular set of CDRs according to at least the one or more updated configuration parameters in the business logic.

At block 722, the re-rating engine 116 may send the reprocessed CDRs to the one or more billing systems via the one or more CDR distributor applications to trigger recalculation of service fees charged to the particular set of subscribers based at least on the reprocessed CDRs by the one or more billing systems. Returning to decision block 708, if the specific group of CDRs is not archived in the data archive store of the wireless carrier network ("no" at decision block 708), the process 700 may proceed to block 724. At block 724, the re-rating engine 116 may terminate the recalculation of the service fees charged to the particular set of subscribers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts that comprise re-rating acts, the re-rating acts including:
   importing a business logic that is used to generate call details records (CDRs) for a plurality of subscribers that use wireless telecommunication services provided by a wireless carrier network;
   receiving a selection of one or more data collector applications of a plurality of data collector applications that are listed in the business logic, the one or more data collector applications corresponding to a specific group of CDRs, the plurality of data collector applications configured to collect CDRs from one or more servers of the wireless carrier network as the plurality of subscribers use the wireless telecommunication services;
   updating one or more configuration parameters in the business logic based on one or more inputted parameter updates;
   receiving a selection of one or more CDR distributor applications of a plurality of CDR distributor applications listed in the business logic, the plurality of CDR distributor applications configured to distribute the CDRs to one or more billing systems of the wireless carrier network;
   determining that an anomalous event that is external to the wireless carrier network occurred and negatively impacted a particular set of subscribers;
   based on the anomalous event that is external to the wireless carrier network occurring and negatively impacting the particular set of subscribers, determining to modify the service fees charged to the particular set of subscribers;
   selecting a particular set of CDRs in the specific group of CDRs that belong to the particular set of subscribers based on one or more inputted selection parameters;
   generating reprocessed CDRs that correspond to the particular set of CDRs by directing the one or more collector applications to retrieve the particular set of CDRs from a data archive store of the wireless carrier network and reprocess the particular set of CDRs according to at least the one or more updated configuration parameters in the business logic; and
   sending the reprocessed CDRs to the one or more billing systems via the one or more CDR distributor applications to trigger recalculation of service fees charged to the particular set of subscribers based at least on the reprocessed CDRs by the one or more billing systems.

2. The one or more non-transitory computer-readable media of claim 1, further comprising acts that include:
   querying one or more data stores of the wireless carrier network to identify the particular set of subscribers; and
   performing the re-rating acts to modify the service fees charged to the particular set of subscribers.

3. The one or more non-transitory computer-readable media of claim 2, wherein the querying includes retrieving subscriber identifiers of the particular set of subscribers via a subscriber lookup query, CDR identifiers of CDRs corresponding to the particular set of subscribers via a record lookup query, or at least one of the subscriber identifiers or CDR identifier via an automated alarm event query.

4. The one or more non-transitory computer-readable media of claim 3, wherein the subscriber identifiers of the subscribers include mobile station international subscriber directory number (MSISDNs).

5. The one or more non-transitory computer-readable media of claim 2, wherein the querying includes querying in response to detecting an occurrence of the anomalous event.

6. The one or more non-transitory computer-readable media of claim 5, wherein the anomalous event is an occurrence of a natural disaster in a geographical area that affects the particular set of subscribers.

7. The one or more non-transitory computer-readable media of claim 1, wherein the one or more inputted parameter updates include at least one parameter update that adjusts a service fee charged to a subscriber or adjust a service fee charged to the subscriber for a particular type of wireless telecommunication service.

8. The one or more non-transitory computer-readable media of claim 1, wherein the business logic is encoded via Extensible Markup Language (XML) in a corresponding configuration file.

9. The one or more non-transitory computer-readable media of claim 1, wherein the re-rating acts further include determining whether the specific group of CDRs is currently archived in the data archive store of the wireless carrier network in addition to being previously sent to the one or more billing systems, and wherein the updating the one or more configuration parameters, the receiving a selection of one or more CDR distributor applications, the selecting the particular set of CDRs, and the generating the reprocessed CDRs, and the sending the reprocessed CDRs are performed when the specific group of CDRs are archived in the data archive store.

10. The one or more non-transitory computer-readable media of claim 1, wherein the specific group of CDRs are stored in the data archive store for a predetermined period of time before being purged from the data archive store.

11. The one or more non-transitory computer-readable media of claim 1, wherein the inputted selection parameters are used to filter one or more CDRs from the specific group of CDRs.

12. The one or more non-transitory computer-readable media of claim 1, wherein the generating includes directing the one or more collector applications to retrieve the particular set of CDRs from the data archive store via corresponding CDR location paths to the particular set of CDRs in the data archive store.

13. The one or more non-transitory computer-readable media of claim 12, wherein the re-rating acts further include modifying one or more of the CDR location paths based on one or more inputted data source path modifications.

14. The one or more non-transitory computer-readable media of claim 1, wherein the re-rating acts further include modifying one or more data destination paths used by the one or more CDR distributor applications to send the reprocessed CDRs to the one or more billing systems based on one or more inputted data destination path modifications.

15. A computer-implemented method, comprising:
monitoring, via one or more computing devices, one or more network components of a wireless carrier network;
detecting, via the one or more computing devices, that an anomalous event that is external to the wireless carrier network occurred and negatively impacted a particular set of subscribers;
based on the anomalous event that is external to the wireless carrier network occurring and negatively impacting the particular set of subscribers, determining to modify the service fees charged to the particular set of subscribers;
identifying, via the one or more computing devices, a particular set of CDRs associated with the particular set of subscribers that are negatively impacted by the anomalous event; and
modifying, via the one or more computing devices, the service fees charged to the particular set of subscribers by generating reprocessed CDRs that correspond to the particular set of CDRs for processing by one or more billing systems.

16. The computer-implemented method of claim 15, wherein the modifying further comprises:
importing a business logic that is used to generate call details records (CDRs) for a plurality of subscribers that use wireless telecommunication services provided by a wireless carrier network;
receiving a selection of one or more data collector applications of a plurality of data collector applications that are listed in the business logic, the one or more data collector applications corresponding to a specific group of CDRs, the plurality of data collector applications configured to collect CDRs from one or more servers of the wireless carrier network as the plurality of subscribers use the wireless telecommunication services;
updating one or more configuration parameters in the business logic based on one or more inputted parameter updates;
receiving a selection of one or more CDR distributor applications of a plurality of CDR distributor applications listed in the business logic, the plurality of CDR distributor applications configured to distribute the CDRs to the one or more billing systems of the wireless carrier network;
selecting a particular set of CDRs in the specific group of CDRs that belong to the particular set of subscribers based on one or more inputted selection parameters;
generating reprocessed CDRs that correspond to the particular set of CDRs by directing the one or more collector applications to retrieve the particular set of CDRs from a data archive store of the wireless carrier network and reprocess the particular set of CDRs according to at least the one or more updated configuration parameters in the business logic; and
sending the reprocessed CDRs to the one or more billing systems via the one or more CDR distributor applications to trigger recalculation of service fees charged to the particular set of subscribers based at least on the reprocessed CDRs by the one or more billing systems.

17. The computer-implemented method of claim 16, wherein the modifying further include determining whether the specific group of CDRs is currently archived in the data archive store of the wireless carrier network in addition to being previously sent to the one or more billing systems, and wherein the updating the one or more configuration parameters, the receiving a selection of one or more CDR distributor applications, the selecting the particular set of CDRs, and the generating the reprocessed CDRs, and the sending the reprocessed CDRs are performed when the specific group of CDRs is archived in the data archive store.

18. The computer-implemented method of claim 15, where the detecting includes querying one or more data stores of the wireless carrier network to identify the particular set of subscribers.

19. A computing device, comprising:
one or more processors; and
memory including a plurality of computer-executable components that are executable by the one or more processors to perform a plurality of actions that comprise re-rating actions, the re-rating actions comprising:
importing a business logic that is used to generate call details records (CDRs) for a plurality of subscribers that use wireless telecommunication services provided by a wireless carrier network;
receiving a selection of one or more data collector applications of a plurality of data collector applications that are listed in the business logic, the one or more data collector applications corresponding to a specific group of CDRs, the plurality of data collector applications configured to collect CDRs from one or more servers of the wireless carrier network as the plurality of subscribers use the wireless telecommunication services;
updating one or more configuration parameters in the business logic based on one or more inputted parameter updates;

receiving a selection of one or more CDR distributor applications of a plurality of CDR distributor applications listed in the business logic, the plurality of CDR distributor applications configured to distribute the CDRs to one or more billing systems of the wireless carrier network;

determining that an anomalous event that is external to the wireless carrier network occurred and negatively impact a particular set of subscribers;

based on the anomalous event that is external to the wireless carrier network occurring and negatively impacting the particular set of subscribers, determining to modify the service fees charged to the particular set of subscribers;

selecting a particular set of CDRs in the specific group of CDRs that belong to the particular set of subscribers based on one or more inputted selection parameters;

generating reprocessed CDRs that correspond to the particular set of CDRs by directing the one or more collector applications to retrieve the particular set of CDRs from a data archive store of the wireless carrier network and reprocess the particular set of CDRs according to at least the one or more updated configuration parameters in the business logic; and sending the reprocessed CDRs to the one or more billing systems via the one or more CDR distributor applications to trigger recalculation of service fees charged to the particular set of subscribers based at least on the reprocessed CDRs by the one or more billing systems.

20. The computing device of claim 19, further comprising actions that include:

querying one or more data stores of the wireless carrier network to identify the particular set of subscribers; and performing the re-rating actions to modify the service fees charged to the particular set of subscribers.

* * * * *